(12) United States Patent
Anderson et al.

(10) Patent No.: US 8,237,730 B1
(45) Date of Patent: Aug. 7, 2012

(54) TONE MAPPING FOR MOTION PICTURES

(75) Inventors: John Anderson, San Anselmo, CA (US); Robert L. Cook, San Anselmo, CA (US)

(73) Assignee: Pixar Animation Studios, Emeryville, CA (US)

( * ) Notice: Subject to any disclaimer, the term of this patent is extended or adjusted under 35 U.S.C. 154(b) by 1036 days.

(21) Appl. No.: 12/187,330

(22) Filed: Aug. 6, 2008

Related U.S. Application Data

(60) Provisional application No. 61/062,195, filed on Jan. 23, 2008.

(51) Int. Cl.
*G09G 5/02* (2006.01)
*G06T 15/50* (2011.01)
*G06T 13/00* (2011.01)
*G06K 9/00* (2006.01)
*G06K 9/40* (2006.01)

(52) U.S. Cl. ........ 345/589; 345/590; 345/426; 345/473; 382/167; 382/169; 382/260

(58) Field of Classification Search ........................ None
See application file for complete search history.

(56) References Cited

U.S. PATENT DOCUMENTS

| | | | | |
|---|---|---|---|---|
| 5,982,941 | A | * | 11/1999 | Loveridge et al. ............. 382/260 |
| 7,385,604 | B1 | * | 6/2008 | Bastos ........................... 345/426 |
| 2008/0089602 | A1 | * | 4/2008 | Heath et al. .................... 382/274 |
| 2009/0109233 | A1 | * | 4/2009 | Kerofsky et al. .............. 345/589 |

* cited by examiner

*Primary Examiner* — Tize Ma
(74) *Attorney, Agent, or Firm* — Patterson & Sheridan, LLP

(57) ABSTRACT

A method for rendering an image including objects defined by surfaces. A rendering application selects an object in a first image and determines a surface of the object. An initial set of illumination values is calculated and is separated into low and high spatial frequency components associated with the surface of the object. The rendering application independently adjusts the illumination values of the low and high spatial frequency components based lighting information in the first image, and generates a modified set of illumination values by combining the adjusted low and high spatial frequency components. The surface of the object is then rendered using the modified set of illumination values. Advantageously, embodiments of the invention provide techniques for rendering an object without introducing halo effects around the object. Additionally, embodiments of the invention provide for rendering a sequence of frames without introducing fluctuations in the low frequency components from across frame.

16 Claims, 5 Drawing Sheets

TONE MAPPING FOR MOTION PICTURES

CROSS-REFERENCE TO RELATED APPLICATIONS

This application claims the priority benefit of provisional U.S. Patent Application Ser. No. 61/062,195, filed Jan. 23, 2008, the subject matter of which is hereby incorporated by reference.

BACKGROUND

1. Field of the Invention

The present invention relates to the field of computer graphics and, in particular, to a method and apparatus for tone mapping for motion pictures.

2. Description of the Related Art

Displaying images having wide variations in illumination while preserving visually important features has proven to be challenging. This problem exists for both rendered images and real images captured on film or with a digital sensor in a digital camera. For example, illuminating an image of a person standing on a beach with the setting sun in the background, while preserving the beauty of the sunset, is a particularly difficult problem to solve. The challenge is to capture detail in the dark foreground as well as in the bright background. For still images, photographers go to great lengths to find ways to illuminate the foreground subject in a manner that looks natural, while preserving the background color and illumination. For motion pictures, a director of photography can carefully apply lighting effects to a shot to achieve the desired effect. However, additional problems arise when attempting to automate these processes.

The above issues are exacerbated when viewing high-dynamic range (HDR) digital images, having wide variations in illumination, on a limited-dynamic range (LDR) display. The human eye can perceive a large dynamic range of brightnesses, and an HDR image attempts to duplicate this dynamic range. Information stored in HDR images often corresponds to the physical illumination values, such as luminance, radiance, contrast, saturation, and the like. HDR images are often called "scene-referred" images. By synthesizing multiple images having overlapping illumination ranges in brightness, user are able to generate HDR images with essentially unlimited dynamic range. By contrast, display screen images, prints, and other output media have a limited dynamic range. Such displayed images are often referred to "device-referred" or "output-referred" images. Because of the disparity in the dynamic ranges of HDR images and LDR displays, various attempts have been made to "trick" the eye into perceiving greater dynamic ranges on LDR displays.

One approach for converting HDR images into a form more viewable on LDR displays is generally referred to as "tone mapping." One conventional tone mapping technique allows a user to select a subset of the entire illumination value range to map to an LDR display. This technique allows the user to "bring up" the detail in the lower end of the illumination range and "pull down" the detail in the higher end of the illumination range to fit within that pre-defined subset. Thus, the range of illumination values of an LDR image can be shifted up or down in an attempt to capture at least some of the detail in both high and low levels of illumination in an HDR image. However, one drawback to tone mapping is that the selected range often includes an area that is too saturated or an area that is too dark, causing the resulting image to look flat and dull. This problem is often referred to as "dynamic range compression."

Some more recent tone mapping techniques have tried to overcome the limitations of dynamic range compression by relying on global operators that implement HDR radiance maps to translate the HDR image to the LDR display using the same tone mapping parameters for each pixel of the output image. Once an optimal mapping has been determined for the entire image, each pixel is mapped using the same mapping function. Some user input is then required to fine-tune certain areas of the image to correct any resulting visual artifacts (e.g., a portion of the image may be too dark to be visible and so the illumination values in this portion may need to be increased). Since each image must be mapped and then locally adjusted, "global" tone mapping is usually an arduous and time-consuming task.

To address the problems with global tone mapping, other tone mapping operators, referred to a "local" tone mapping operators, have been developed where local gradients are preserved. With local tone mapping operators, illumination value gain changes and brightness levels of surrounding pixels influence the mapping for a particular pixel, thereby addressing the artifacts introduced using global tone map operators. However, a problem often encountered with using local tone mapping operators is the generation of a "halo" or "ringing" effect. For example, a brightly-colored object may be set against a dark background. When tone mapping such an image using a local tone mapping operator, the illumination values of the dark pixels immediately surrounding the object are influenced by the brightness of the object, creating an artifact that resembles a halo or glow that surrounds the object. These halo effects can be reduced manually by a user after the local tone mapping operation has completed. Again, manual adjustment can become cumbersome and time-consuming.

Each of these problems set forth above is exacerbated in the context of motion pictures, because variations between sequential images (e.g., frames) change over time. For example, processing individual images in a sequence using prior art tone mapping techniques would generally result in variations in tone mapping from image to image, causing the images to "pop" or, alternatively, causing halo effects that move through the frames with an object.

As the foregoing illustrates, there is a need in the art for an improved tone mapping technique that is also suitable for motion pictures.

SUMMARY

Embodiments of the invention provide a method for tone mapping images that is applicable for motion pictures. Each object in a still image (or in a single frame of an animation sequence) is tone mapped separately based on that surface of the object, thus eliminating halo effects or ringing artifacts around the object. Additionally, tone mapping on individual surfaces enables tone mapping to be performed to a sequence of animation frames without introducing low frequency artifacts, as is common with prior art approaches. Embodiments of the invention may be applied to tone mapping for motion pictures as well as to real-time tone mapping for video games.

One embodiment of the invention provides a technique for rendering an image including objects defined by surfaces. A rendering application selects an object in a first image and determines a surface of the object. An initial set of illumination values is calculated and is separated into low and high spatial frequency components associated with the surface of the object. The rendering application independently adjusts the illumination values of the low and high spatial frequency components based lighting information in the first image, and generates a modified set of illumination values by combining the adjusted low and high spatial frequency components. The surface of the object is then rendered using the modified set of illumination values.

Alternative embodiments of invention provide a technique for rendering a pixel in an image that is intersected by two or more objects, where each object being defined by one or more surfaces. A rendering application determines that first and second objects contribute to the display characteristics of the first output pixel. The rendering application generates a first mapping from an initial set of illumination values for a surface of the first object to a modified set of illumination values for the surface of the first object. The rendering application generates a second mapping from an initial set of illumination values for a surface of the second object to a modified set of illumination values for the surface of the second object. Generating the first and second mappings includes separating the initial set of illumination values into low spatial frequency components associated with the surface of each of the first object and the second object and high spatial frequency components associated with the surface of each of the first object and the second object, adjusting illumination values associated with the low spatial frequency components based on lighting information associated with the image, and adjusting illumination values associated with the high spatial frequency components based on lighting information associated with the image. The rendering application applies an operator to determine a color value and an illumination value for each sub-pixel of the first output pixel based on the modified set of illumination values for the surface of the first object and the modified set of illumination values of the surface of the second object, and renders the first output pixel.

Additional embodiments of the invention provide a technique for rendering an animation sequence of a scene having one or more objects defined by one or more surfaces. The rendering application selects a first frame of the animation sequence, and for a first object in the first frame, generates a mapping from an initial set of illumination values to a modified set of illumination values based on lighting information associated with the first frame. For each frame of the animation sequence, the rendering application applies the mapping to adjust the illumination values for the surface of the first object in the frame, and renders the surface of the first object for each frame in the animation sequence using the adjusted illumination values.

Alternative embodiments of the invention provide a for rendering an animation sequence of a scene having one or more objects defined by one or more surfaces. A rendering application selects a first frame included in the animation sequence, and calculates a first initial set of illumination values associated with a surface of the object based on lighting information associated with the first frame. The rendering application selects a second frame included in the animation sequence, and calculates a second initial set of illumination values associated with the surface of the object based on lighting information associated with the second frame. The rendering application separates the first initial set of illumination values into low frequency components associated with the surface of the object and high frequency components associated with the surface of the object. The rendering application adjusts illumination values associated with the low frequency components based on lighting information associated with the first frame and the second initial set of illumination values. Similarly, the rendering application adjusts illumination values associated with the high frequency components based on lighting information associated with the first frame and the second initial set of illumination values.

The rendering application generates a first modified set of illumination values by combining the adjusted low frequency components and the adjusted high frequency components, and renders the first frame of the animation sequence based on the first modified set of illumination values.

Advantageously, embodiments of the invention allow for an improved method of tone mapping that significantly reduced halo artifacts around objects as well as jarring low frequency effects in an animation sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide a method for tone mapping images that is applicable for motion pictures. Each object in a still image (or in a single frame of an animation sequence) is tone mapped separately based on that surface of the object, thus eliminating halo effects or ringing artifacts around the object. Additionally, tone mapping on individual surfaces enables tone mapping to be performed to a sequence of animation frames without introducing low frequency artifacts, as is common with prior art approaches. Embodiments of the invention may be applied to tone mapping for motion pictures as well as to real-time tone mapping for video games.

Figure 1:
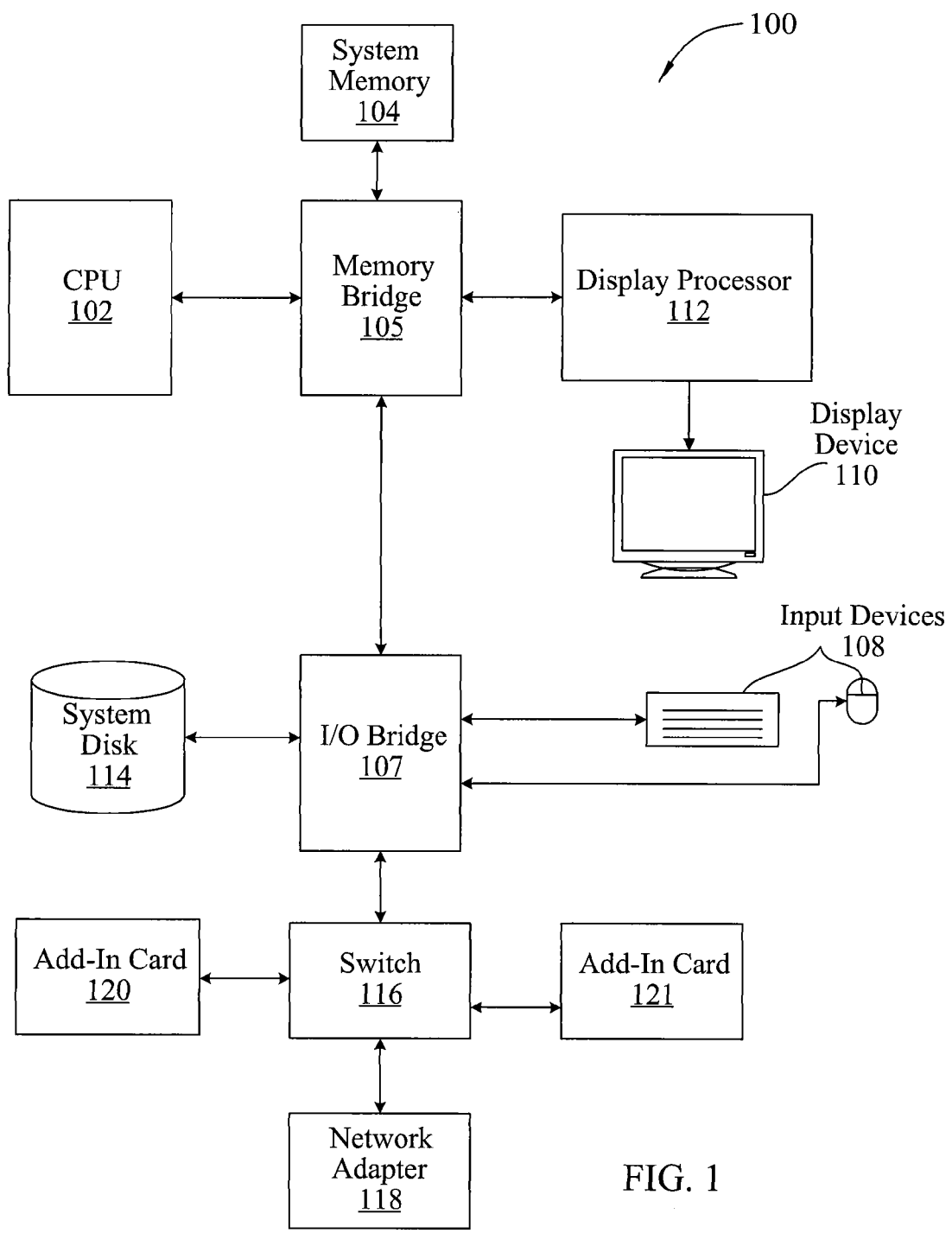
FIG. 1 is a block diagram of a system configured to implement one or more aspects of the present invention.

FIG. 1 is a block diagram of a system 100 configured to implement one or more aspects of the present invention. System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor). Additionally, display processor 112 may output pixels to film recorders adapted to reproduce computer generated images on photographic film. Display processor 112 can provide display device 110 with an analog or digital signal. In alternative embodiments, the display device 110 is a print.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
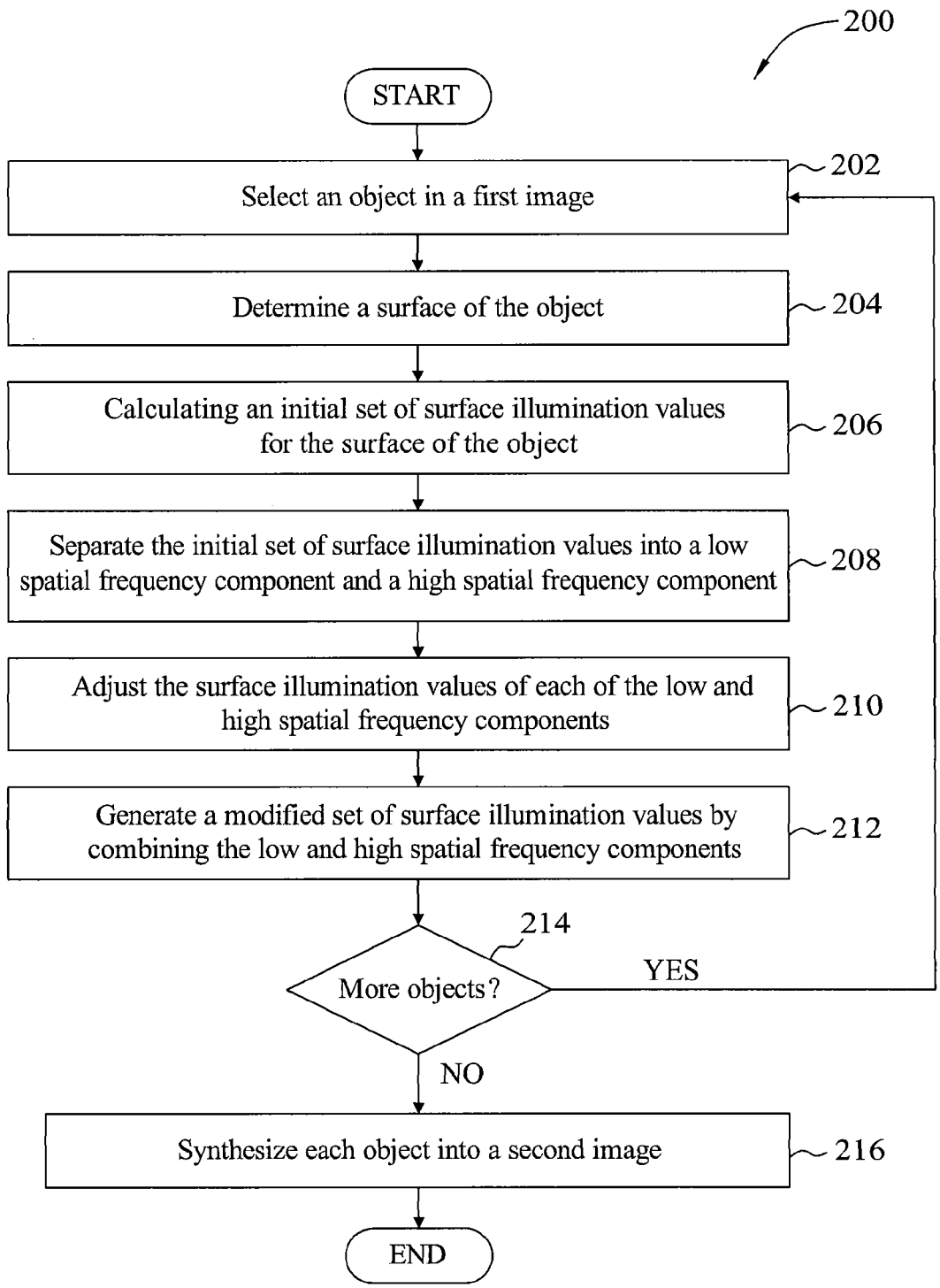
FIG. 2 is a flow diagram of method steps for tone mapping an object in an image based on the surface of the object, according to one embodiment of the invention.

FIG. 2 is a flow diagram of method steps for tone mapping an object in an image based on the surface of the object, according to one embodiment of the invention. Persons skilled in the art will understand that, even though method 200 is described in conjunction with the systems of FIG. 1, any system configured to perform the steps of the method 200 illustrated in FIG. 2, in any order, is within the scope of the present invention.

As described above, when using conventional pixel-based tone mapping systems (i.e., those implementing local tone mapping operators), if a brightly-colored object is placed in front of a darkly-colored background, then a halo artifact may result because the color of the portion of the background region surrounding the brightly-colored object is influenced by the illumination values and color of the brightly-colored foreground object. Certain embodiments of the invention solve this halo artifact problem by tone mapping each image object separately from the background of the image. Consequently, the pixels of the image background are not influenced by the pixels of the foreground image objects, thereby mitigating halo-type artifacts.

As shown, method 200 begins at step 202 where a rendering application selects an object in a first image. As is known, in computer-generated (CG) images, objects in an image may be defined by a polygon mesh of triangles or other primitives. For example, each object in the first image may have been created using a computer modeling or animation software program. In alternative embodiments, the first image may be captured using a live action camera. In such a case, the geometry of the objects in the image may not be initially known, but geometry may be mapped to the objects in the captured image by building "matched-move geometry," which creates proxy geometry for the objects displayed in the live action scene. Once the matched-move geometry has been created, CG elements may be added to the scene or the objects in the scene may be modified (e.g., where shadows are cast onto a real object from a CG element or from a real object onto a CG element). In still further embodiments, if the first image is captured using a high-definition stereo camera, then matched-move geometry may be generated automatically.

At step 204, the rendering application determines a surface of the selected object. In one embodiment, the surface of the object may include a polygon mesh of triangles or other primitives. In alternative embodiments, the surface of the selected object may be defined in any other technically feasible way known in the art.

At step 206, the rendering application calculates an initial set of surface illumination values for the surface of the object. Illumination values may include luminance, radiance, saturation, contrast, other surface properties, and the like. The illumination values may be calculated using any known technique, including rasterization, scanline rendering, REYES or micropolygon rendering, ray casting, ray tracing, image-based rendering techniques, and/or combinations of these, and any other technically feasible rendering or image processing techniques known in the art. For example, when rendering a modeled image, the illumination values may be computed by the rendering engine. By contrast, if the image is derived from a live action camera and converted to matched-move geometry, then the illumination values may need to be calculated separately. In one embodiment, the initial set of surface illumination values may be calculated for the entire surface of the object. In alternative embodiments, the surface of the object may be divided into portions. Surface illumination values may then be determined separately for each portion of the surface of the object and combined together to form the initial set of surface illumination values for the entire surface of the object.

At step 208, the rendering application separates the initial set of surface illumination values for the surface of the object into a low spatial frequency component and a high spatial frequency component. In one embodiment, the low spatial frequency component includes the generally "smooth" portions of the surface of the object, and the high spatial frequency component includes the generally "fine detail" portions of the surface of the object. For example, to determine the high spatial frequency component, a Gaussian value may be computed by calculating an average illumination value of the surface of the object. This technique is commonly referred to as a "Gaussian blur." The Gaussian value may be subtracted from the initial illumination value of each primitive included in the surface of the object, thereby determining the high spatial frequency component for each of those primitives. The high spatial frequency components may then be subtracted from the initial illumination values of each primitive to generate the low spatial frequency components for the surface. In alternative embodiments, other techniques may be implemented to separate the initial set surface illumination values of the object surface into low and high spatial frequency components, e.g., spatial filtering, fitting low frequency splines, among others. In still further embodiments of the invention, the separation may include separating the initial set of surface illumination values into "low frequency components," which may include low spatial frequency components and low temporal frequency components, and "high frequency components," which may include high spatial frequency components and high temporal frequency components.

At step 210, the rendering application independently adjusts the surface illumination values of each of the low spatial frequency component and high spatial frequency component based on lighting information in the first image. Various methods are generally known for performing this operation.

At step 212, the rendering application generates a modified set of surface illumination values by combining the adjusted low spatial frequency component and adjusted high spatial frequency component. The modified set of surface illumination values corresponds to the illumination values of a tone-mapped surface, where high and low spatial frequency detail is preserved, but the dynamic range is compressed. As persons skilled in the art will recognize, a mapping between the initial set of illumination values determined for the object surface at step 206 and the modified set of illumination values determined for the object surface at step 212 reflects one form of a tone map that may be generated for that object surface.

At step 214, the rendering application determines whether any other objects in the first image need to be processed. If so, then the method 200 returns to step 202, where steps 202-212 are repeated for each additional object in the first image. If at step 214, no more objects need to be processed, then the method 200 proceeds to step 216.

At step 216, the rendering application synthesizes each object into a second image. As described above, each object is associated with a modified set of surface illumination values. The second image may be displayed on an output device, such as monitor or a projector. Alternatively, the second image may be printed on a physical medium. In one embodiment, the second image includes multiple objects, each independently processed using method 200. The modified illumination values of each object in the second image are influenced only by the illumination values of the surface that makes up the object, as opposed to the surrounding objects or pixels, as in prior art approaches.

Figure 3:
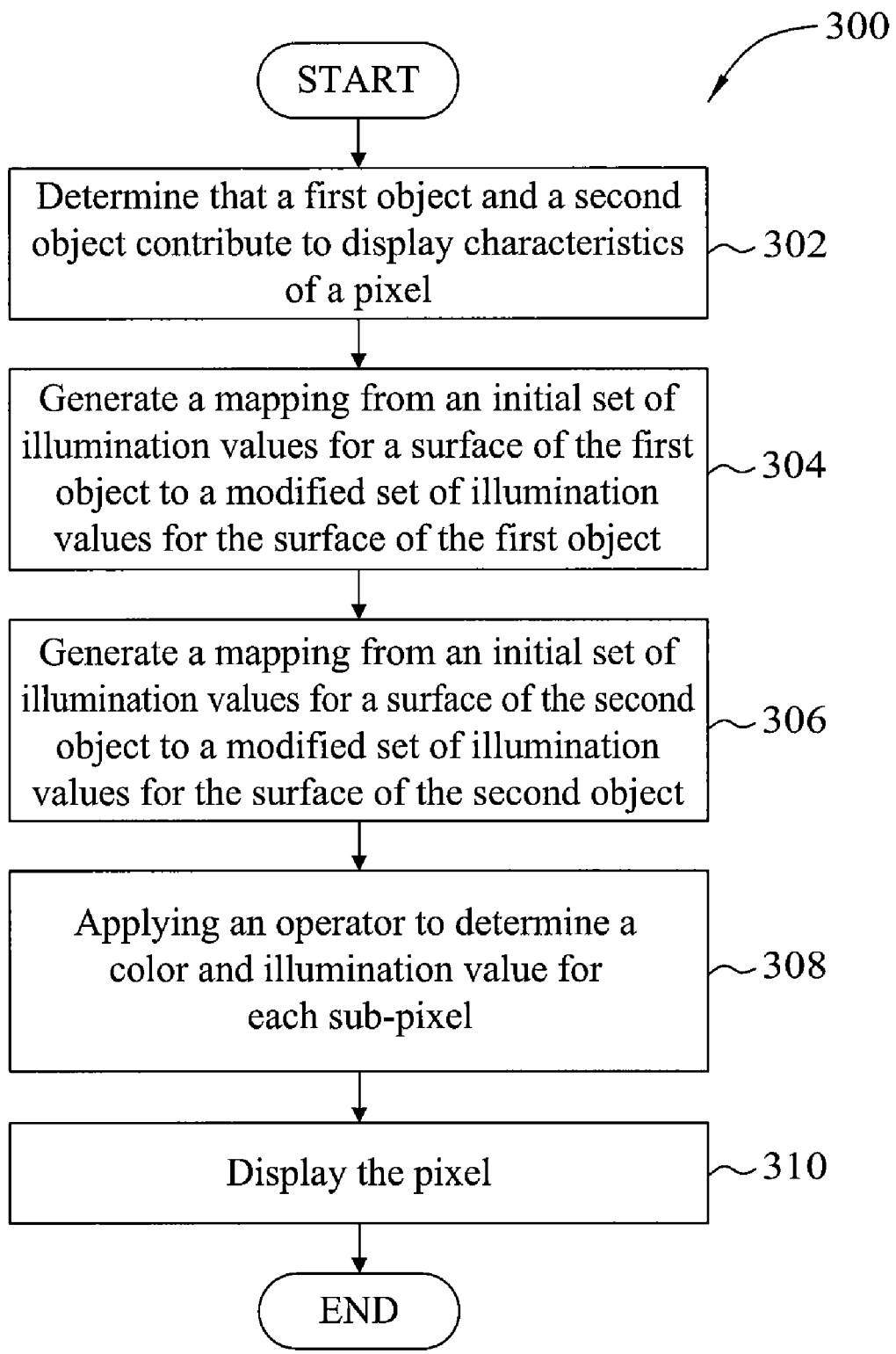
FIG. 3 is a flow diagram of method steps for displaying a pixel whose illumination values and color are influenced by two or more objects within an image, according to one embodiment of the invention.

FIG. 3 is a flow diagram of method steps for displaying a pixel whose illumination values and color are influenced by two or more objects within an image, according to one embodiment of the invention. Persons skilled in the art will understand that, even though method 300 is described in conjunction with the systems of FIG. 1, any system configured to perform the steps of the method 300 illustrated in FIG. 3, in any order, is within the scope of the present invention.

As shown, the method 300 begins at step 302, where a rendering application determines that a first object and a second object contribute to the display characteristics of an output pixel. As is known, if two objects are adjacent to one another or overlapping in a z-plane, then each object may contribute to the display characteristics of a pixel that lies on the border between the two objects.

At step 304, the rendering application generates a mapping from an initial set of illumination values for a surface of the first object to a modified set of illumination values for the surface of the first object. In one embodiment, steps 204-212 set forth the way in which step 304 is performed. At step 306, the rendering application generates a mapping from an initial set of illumination values for a surface of the second object to a modified set of illumination values for the surface of the second object. In one embodiment, steps 204-212 set forth the way in which step 306 is performed.

At step 308, an operator is applied to determine a color and illumination value for each sub-pixel of the pixel based on the modified set of illumination values for the surface of the first object and the modified set of illumination values for the surface of the second object. As is known, the pixel may be divided into a series of sub-pixels. In one embodiment, the operator is an anti-aliasing operator that separately calculates the average color and illumination values for each sub-pixel in the pixel. For example, the first object may contribute to the color and illumination value of one-third of the sub-pixels, and the second object may contribute to the color and illumination value of the remaining two-thirds of the sub-pixels (e.g., the first object "overlaps" one-third of the sub-pixels and the second object "overlaps" two-thirds of the sub-pixels). The color and illumination value of the pixel would be equal to a weighted average of the contributions of each of the first and second objects to the overall color and illumination values of the pixel arising from the proportion of sub-pixels each object covers. Each sub-pixel in the pixel would then be assigned the same "average" color and illumination value resulting from this computation. In alternative embodiments, the color and illumination value of each sub-pixel may be based on the object that covers that particular sub-pixel. In such a case, no weighted average is computed. In still further embodiments, other operators known in the art, such as other anti-aliasing operators, may be applied at step 308.

At step 310, the pixel is displayed via a display device or on a physical output medium.

As described above in FIG. 2, embodiments of the invention provide a technique for tone mapping the objects in an image based on the surfaces of these objects. Performing tone-map operations in this fashion allows tone mapping to be extended to the time domain.

Continuing with the example of a brightly-colored object (e.g., a ball) placed in front of a darkly-colored background, using conventional approaches, if the ball is moving, then the halo around the ball is persistent from frame to frame as the ball moves around the image. Since the human eye is very sensitive to high-frequency changes in brightness and is very adept at edge-detection and contrast detection, the "moving halo" is usually quite visible to observers.

Additionally, when performing conventional pixel-based tone mapping on frames of an animation sequence, fluctuations in low spatial frequency components are also usually visible from frame-to-frame. For example, when tone mapping a first frame of an animation sequence, an "average" brightness value may be computed for each pixel in the frame. This average may correspond to a low spatial frequency component for a tone mapping operator and may serve as the "baseline" brightness level for each pixel from which the brightness is increased for brighter areas of the frame. In a subsequent frame in the animation sequence, an object may have moved relative to the object's position in the first frame. Using convention techniques, the "average" brightness would be computed for this subsequent frame. Because of the object's movement, though, the average brightness for the subsequent frame may be different from the average brightness of the first frame. This difference in average brightness causes a fluctuation in the low spatial frequency components present in each frame, a phenomenon that is usually visible by an observer.

As described below in FIG. 4, since the relationship between lighting geometry and a given object surface is usually stable from frame-to-frame, the same tone mapping parameters may be used for a particular object across each frame in an animation sequence. With such an approach, the fluctuations in the low spatial frequency components present across the frames that may arise using prior art techniques may be reduced because the low spatial frequency components of the illumination values on a surface of a single object do not usually change enough from frame to frame to cause visual artifacts.

Figure 4:
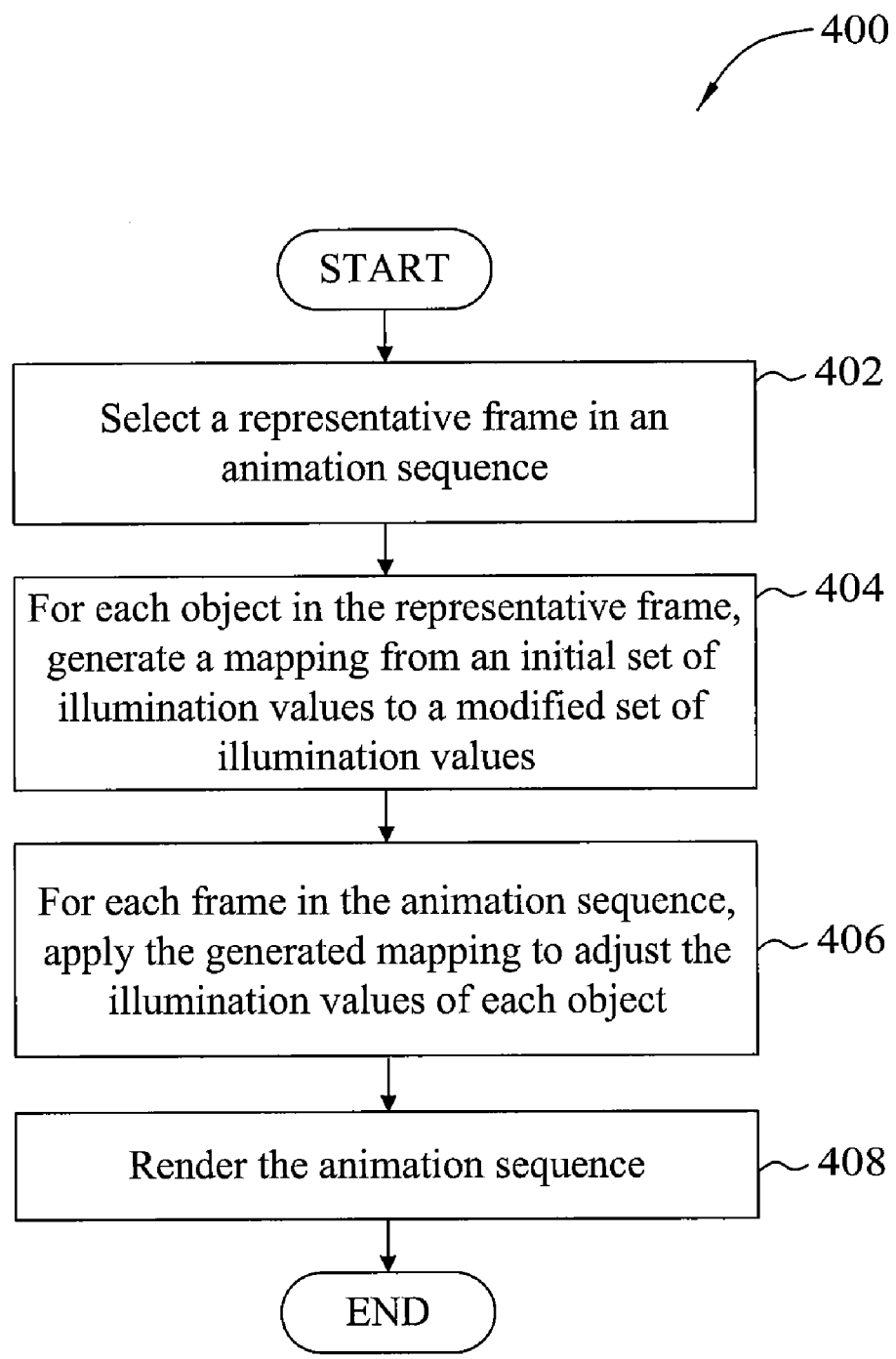
FIG. 4 is a flow diagram of method steps for tone mapping an animation sequence based on the surfaces of the objects using in the animation sequence, according to one embodiment of the invention.

FIG. 4 is a flow diagram of method steps for tone mapping an animation sequence based on the surfaces of the objects using in the animation sequence, according to one embodiment of the invention. Persons skilled in the art will understand that, even though method 400 is described in conjunction with the systems of FIG. 1, any system configured to perform the steps of the method 400 illustrated in FIG. 4, in any order, is within the scope of the present invention.

As shown, the method 400 begins at step 402, where a rendering application selects a representative frame of an animation sequence. In one embodiment, the representative frame is the frame that captures most of the very dark or very bright portions of the scene that is being displayed in the animation sequence. In alternative embodiments, the representative frame may be any frame included in the animation sequence, a composite frame, or frame that is composed of a combination of two or more frames (e.g., a combined frame).

At step 404, for each object in the representative frame, the rendering application generates a mapping from an initial set of illumination values to a modified set of illumination values based on lighting information in the representative frame. In one embodiment, the initial set of illumination values includes illumination values having a high dynamic range and the modified set of illumination values includes tone mapped illumination values using embodiments of the invention. For example, steps 204-212 of FIG. 2 set forth the way in which step 404 is performed.

At step 406, for each frame in the animation sequence, the rendering application applies the mapping to each object to adjust the illumination values of each object. Again, since the relationship between the lighting geometry and the surfaces of the object is typically stable from frame-to-frame, when the mapping is applied to the object over a series of frames, the result includes few visual artifacts.

At step 408, the rendering application renders the animation sequence using any technically feasible operation.

Using embodiments of the invention, illumination value gradients are preserved over the surface of each object in each frame. Importantly, the illumination values of one object do not influence the illumination values of neighboring objects in the scene. Illumination values for objects that are disconnected in space in the animation sequence are processed and rendered separately. Thus, not only are halo artifacts eliminated, as described above in FIG. 2, fluctuations in the low frequency components are also reduced because lighting geometry and the surfaces of each object are typically stable from frame-to-frame.

Figure 5:
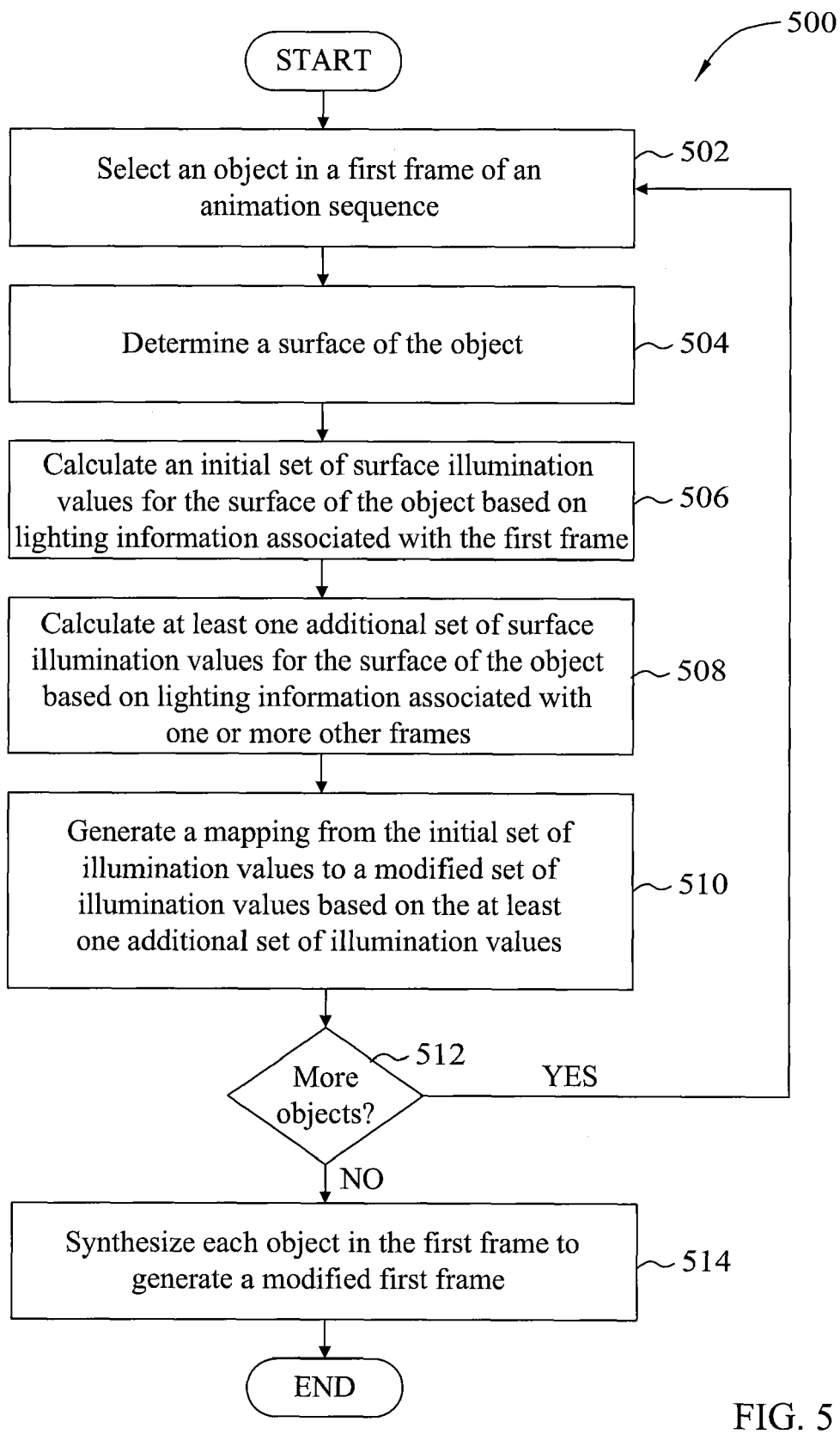
FIG. 5 is a flow diagram of method steps for dynamically tone mapping each frame of an animation sequence based on the surfaces of the objects in the animation sequence, according to another embodiment of the invention.

In conjunction with the methods described in FIGS. 2-4, additional improvements in image quality may be achieved by dynamically varying tone mapping parameters based on future changes to illumination values in an animation sequence. FIG. 5 below introduces the concept of "motion planning," whereby the rendering application is capable of looking ahead several frames in an animation sequence to determine the illumination values for an object in future frames and using this information when tone mapping the current frame. Such an approach is useful for "ramping up" or "ramping down" the range of an LDR display when a large change is contrast exists in one or more upcoming frames.

FIG. 5 is a flow diagram of method steps for dynamically tone mapping each frame of an animation sequence based on the surfaces of the objects in the animation sequence, according to another embodiment of the invention. Persons skilled in the art will understand that, even though method 500 is described in conjunction with the systems of FIG. 1, any system configured to perform the steps of the method 500 illustrated in FIG. 5, in any order, is within the scope of the present invention.

As shown, the method 500 begins at step 502, where a rendering application selects an object in a first frame of an animation sequence. In one embodiment, the step 502 is substantially similar to step 202 of FIG. 2. At step 504, the rendering application determines a surface of the object. In one embodiment, step 504 is substantially similar to step 204 of FIG. 2 and, therefore, is not described in greater detail herein. At step 506, the rendering application calculates an initial set of illumination values for the surface the object based on lighting information associated with the first frame. In one embodiment, the first set of illumination values may be based on the luminance, radiosity, contrast, and/or saturation of the surface of the object in the first frame.

At step 508, the rendering application calculates at least one additional set of illumination values for the surface the object based on lighting information associated with one or more other frames. The other frames may be frames that are displayed before the first frame, frames that are displayed after the first frame, or a combination of frames that are displayed before the first frame and frames that are displayed after the first frame.

At step 510, the rendering application generates a mapping from the initial set of illumination values to a modified set of illumination values based on the at least one additional sets of illumination values. In this way, the application is capable of "anticipating" an increase or a decrease of the illumination values in upcoming frames of the animation sequence. For example, an animation sequence may involve a character moving around a dark room. At some point in the animation sequence, a light switch in the room is turned on and the brightness in the room significantly increases. Thus, using embodiments of the invention, a rendering application is able to predict this very fast increase in brightness and may begin to slowly "ramp down" the illumination values in the frames leading up to the light-switch event. Once the illumination values have been ramped down, there is some "head room" in the limited dynamic range of the display device to allow for an increase in brightness indicative of the light being turned on.

At step 512, the rendering application determines whether there are other objects in the first frame that need to be processed. If so, the method 500 returns to step 502, where steps 502-510 are repeated for each additional object in the first frame. If, at step 512, no more objects have to be processed, then the method 500 proceeds to step 514.

At step 514, the rendering application synthesizes each object in the first frame to generate a modified first frame. As described above, each object in the modified first frame is associated with a modified set of illumination values. Step 514 is similar to step 216 of FIG. 2, and no additional detail is provided herein. As persons skilled in the art will appreciate, the method 500 may be repeated for any frame in the animation sequence.

Advantageously, embodiments of the invention provide a technique for tone mapping an image that is also applicable for motion pictures. Each object in a still image (or in a single frame of an animation sequence) is tone mapped separately based on that surface of the object, thus eliminating halo effects or ringing artifacts around the object. Additionally, tone mapping on individual surfaces enables tone mapping to be performed to a sequence of animation frames without introducing fluctuations in low frequency components from frame-to-frame, as is common with prior art approaches. Embodiments of the invention may be applied to tone mapping for motion pictures as well as to real-time tone mapping for video games.

Various embodiments of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the present invention. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for rendering a pixel in an image that is intersected by two or more objects, each object being defined by one or more surfaces, the method comprising:
determining that a first object contributes to display characteristics of a first output pixel;
determining that a second object contributes to display characteristics of the first output pixel;
generating a first mapping from a first initial set of illumination values for a surface of the first object to a first modified set of illumination values for the surface of the first object;
generating a second mapping from a second initial set of illumination values for a surface of the second object to a second modified set of illumination values for the surface of the second object;
applying an operator to determine a color value and an illumination value for each sub-pixel of the first output pixel based on the first modified set of illumination values for the surface of the first object and the second modified set of illumination values of the surface of the second object; and
rendering the first output pixel,
wherein generating the first and second mappings includes:

separating the first initial set of illumination values into low spatial frequency components associated with the surface of the first object and high spatial frequency components associated with the surface of the first object, separating the second initial set of illumination values into low spatial frequency components associated with the surface of the second object and high spatial frequency components associated with the surface of the second object, adjusting illumination values associated with the low spatial frequency components based on lighting information associated with the image, and adjusting illumination values associated with the high spatial frequency components based on lighting information associated with the image.

2. The method according to claim 1, wherein the operator is an anti-aliasing operator for calculating an average color value and an average illumination value for each sub-pixel based on contributions from each of the first and second object.

3. A method for rendering an animation sequence of a scene having one or more objects defined by one or more surfaces, the method comprising:

selecting a first frame included in the animation sequence;

calculating a first initial set of illumination values associated with a surface of an object of the one or more objects based on lighting information associated with the first frame;

selecting a second frame included in the animation sequence;

calculating a second initial set of illumination values associated with the surface of the object based on lighting information associated with the second frame;

separating the first initial set of illumination values into low frequency components associated with the surface of the object and high frequency components associated with the surface of the object;

adjusting illumination values associated with the low frequency components based on lighting information associated with the first frame and the second initial set of illumination values;

adjusting illumination values associated with the high frequency components based on lighting information associated with the first frame and the second initial set of illumination values;

generating a first modified set of illumination values by combining the adjusted illumination values associated with low frequency components and the adjusted illumination values associated with high frequency components; and rendering the first frame of the animation sequence based on the first modified set of illumination values.

4. The method according to claim 3, wherein the first frame is temporally before the second frame.

5. The method according to claim 3, wherein the second frame is temporally before the first frame.

6. The method according to claim 3, wherein separating the first initial set of illumination values into low frequency components includes separating the first initial set of illumination values into low spatial frequency components and low temporal frequency components.

7. The method according to claim 3, wherein separating the first initial set of illumination values into high frequency components includes separating the first initial set of illumination values into high spatial frequency components and high temporal frequency components.

8. The method according to claim 3, wherein the first modified set of illumination values includes values that are less than corresponding illumination values in the first initial set of illumination values.

9. The method according to claim 8, wherein a difference between the first modified set of illumination values and the first initial set of illumination values is attributable to an increase in lighting information present in one or more frames in the animation sequence subsequent to the first frame.

10. A non-transitory computer-readable medium storing instructions that, when executed by a processor, cause a rendering application to render a pixel in an image that is intersected by two or more objects, each object being defined by one or more surfaces, by performing the steps of:

determining that a first object contributes to display characteristics of a first output pixel;

determining that a second object contributes to display characteristics of the first output pixel;

generating a first mapping from a first initial set of illumination values for a surface of the first object to a first modified set of illumination values for the surface of the first object;

generating a second mapping from a second initial set of illumination values for a surface of the second object to a second modified set of illumination values for the surface of the second object;

applying an operator to determine a color value and an illumination value for each sub-pixel of the first output pixel based on the first modified set of illumination values for the surface of the first object and the second modified set of illumination values of the surface of the second object; and rendering the first output pixel, wherein generating the first and second mappings includes:

separating the first initial set of illumination values into low spatial frequency components associated with the surface of the first object and high spatial frequency components associated with the surface of the first object, separating the second initial set of illumination values into low spatial frequency components associated with the surface of the second object and high spatial frequency components associated with the surface of the second object, adjusting illumination values associated with the low spatial frequency components based on lighting information associated with the image, and adjusting illumination values associated with the high spatial frequency components based on lighting information associated with the image.

11. The computer-readable medium according to claim 10, wherein the operator is an anti-aliasing operator for calculating an average color value and an average illumination value for each sub-pixel based on contributions from each of the first and second object.

12. A non-transitory computer-readable medium storing instructions that, when executed by a processor, cause a rendering application to render an animation sequence of a scene having one or more objects defined by one or more surfaces, by performing the steps of:

selecting a first frame included in the animation sequence;

calculating a first initial set of illumination values associated with a surface of an object of the one or more objects based on lighting information associated with the first frame;

selecting a second frame included in the animation sequence;

calculating a second initial set of illumination values associated with the surface of the object based on lighting information associated with the second frame;

separating the first initial set of illumination values into low frequency components associated with the surface of the object and high frequency components associated with the surface of the object;

adjusting illumination values associated with the low frequency components based on lighting information associated with the first frame and the second initial set of illumination values;

adjusting illumination values associated with the high frequency components based on lighting information associated with the first frame and the second initial set of illumination values;

generating a first modified set of illumination values by combining the adjusted illumination values associated with low frequency components and the adjusted illumination values associated with high frequency components; and rendering the first frame of the animation sequence based on the first modified set of illumination values.

13. The computer-readable medium according to claim 12, wherein separating the first initial set of illumination values into low frequency components includes separating the first initial set of illumination values into low spatial frequency components and low temporal frequency components.

14. The computer-readable medium according to claim 12, wherein separating the first initial set of illumination values into high frequency components includes separating the first initial set of illumination values into high spatial frequency components and high temporal frequency components.

15. The computer-readable medium according to claim 12, wherein the first modified set of illumination values includes values that are less than corresponding illumination values in the first initial set of illumination values.

16. The computer-readable medium according to claim 15, wherein a difference between the first modified set of illumination values and the first initial set of illumination values is attributable to an increase in lighting information present in one or more frames in the animation sequence subsequent to the first frame.

* * * * *